MAGNETIC REPRODUCING HEAD

Filed Oct. 12, 1955

INVENTOR
SIMON DUINKER
WILLEM KLAAS WESTMIJZE
BY Fred M. Vogel
AGENT

United States Patent Office 2,907,834

Patented Oct. 6, 1959

2,907,834

MAGNETIC REPRODUCING HEAD

Simon Duinker and Willem Klaas Westmijze, Eindhoven, Netherlands, assignors, by mesne assignments, to North American Philips Company, Inc., New York, N.Y., a corporation of Delaware Application October 12, 1955, Serial No. 540,066

Claims priority, application Netherlands October 15, 1954

5 Claims. (Cl. 179—100.2)

Figure 1:
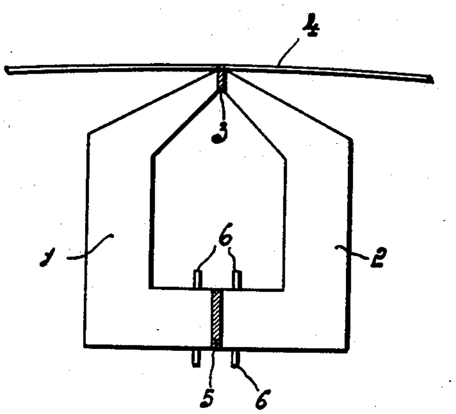

The present invention relates to a magnetic reproducing head. More particularly, the invention relates to a magnetic reproducing head utilizing a Hall plate.

A magnetic reproducing head comprises an element for converting the magnetic flux into an electric voltage.

In reproducing heads of known type, the converting element comprises a coil which surrounds part of the magnetic circuit and at the ends of which an electric alternating voltage occurs having a value which is proportional to the flux variation in said part of the magnetic circuit and having a frequency equal to that of the alternating flux.

In the magnetic reproducing head according to the invention, the element converting the flux traversing the magnetic circuit into an electric voltage comprises at least one Hall plate or member utilizing the Hall effect which is included in the magnetic circuit.

The term "Hall plate" is to be understood in this connection to mean a plate-shaped body of a material having a sufficiently strong Hall effect for the envisaged purpose. For the Hall effect use is made of the phenomenon that when free charge carriers flow with a current density $j$ through a body which is also exposed to a magnetic field B at right angles to $j$, an electric field strength F results having a direction at right angles to the plane passing through the current and the magnetic field directions.

Although any material containing free charge carriers exhibits the said Hall effect, it is not possible for any arbitrary material to be used in a reproducing head according to the invention, since the so-called Hall coefficient R, which is a measure of the strength of the effect, is required to exceed a determined value.

It may be assumed that the minimum required output voltage of the reproducing head at which the level of the reproduction still reasonably lies above the noise level of the amplifier, has a value of approximately $10^{-6}$ volt. In this event, the magnetic flux originating from the magnetic carrier is assumed to be $10^{-11}$ volt sec. Then, for theoretical reasons, the Hall coefficient R in a reproducing head according to the invention must be higher than a value which may be calculated from $$R=10^5\sqrt{\frac{k^3.b.d.\rho}{W}}$$

wherein R is the Hall coefficient in meters$^3$ per ampere second, $k$, $b$ and $d$ represent the dimensions of the Hall plate in meters, in such a sense that $k$ has the same direction as current traversing the element, while W represents the energy in watts dissipated in the plate and $\rho$ represents the specific electric resistance coefficient in ohm-meters.

Before selecting a material for the Hall plate, it is necessary first to fill in the formula the requirements which will be imposed upon a reproducing head according to the invention, whereupon by comparison with the values of the Hall coefficients known from the art, it is possible to select a suitable material for a particular case. For other cases use may be made of other materials. The field of the materials which enter into consideration may be widened by modified requirements, for example by admitting a higher dissipated energy. This is possible, for example, by raising the current density in the element. This raise in current density naturally has practical limits, since the heat production which occurs in said body when traversed by current brings about a local increase in temperature which is also determined by the speed at which the heat produced can be dissipated.

In view thereof, a reproducing head according to the invention advantageously comprises means for cooling the circuit at the area of the Hall plate-shaped bodies.

However, in practice the amount of electrical energy which may be introduced into the element cannot exceed a value of several watts, so that a limit is also set to the current density.

An advantage of a magnet head construction according to the invention over that in which a coil is utilized primarily resides in the fact that the electric voltage is independent of the frequency of the alternating flux, since the electric voltage as a result of the Hall effect is determined by the amplitude $\phi_0$ of the flux $\phi$ while the electric voltage as a result of induction in a coil is determined by the flux variation $$\frac{d\phi}{dt}$$

This implies that the troublesome voltage drop in the range of the low frequencies, which is 6 db per octave, does not occur with the inventive construction and an advantageous signal-to-noise ratio occurs in said range.

Furthermore, a constant electric signal is set up at the element when the tape is at rest, it thus being possible to determine the instantaneous value of the recorded magnetic field strength.

Figure 2:
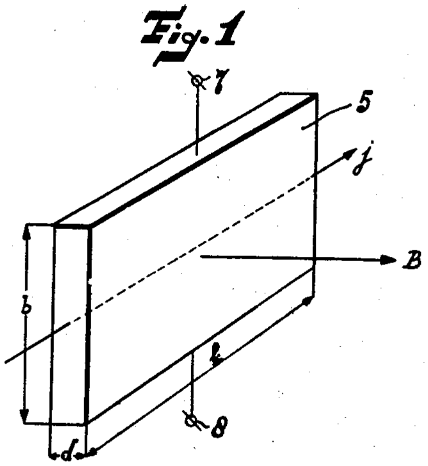

In order that the invention may be readily carried into effect, it will now be described, by way of example, with reference to the accompanying drawing, wherein:

Fig. 1 is a schematic diagram of an embodiment of the magnetic reproducing head of the present invention; and Fig. 2 is a schematic diagram of the plate 5 of the magnetic reproducing head of Fig. 1, on an enlarged scale.

Fig. 1 shows a magnetic reproducing head comprising two circuit portions 1 and 2, for example of ferrite material. At the front thereof is a useful or active gap 3 along which a magnetized carrier 4, e. g., a magnetic tape, for magnetic records is moved. At the back of the circuit the two circuit portions are connected to each other via an element 5 which, according to the invention, is constituted by a Hall plate. The Hall plate 5, which may be of semiconductive material, may be a ground plate of germanium, silicon or an alloy of indium and antimony. But in addition to obtaining such a plate by means of a grinding treatment, it is possible to apply the material by evaporation to both circuit portions 1 and 2, or to one of them, so as to obtain very thin foils.

In Fig. 2, in which the element 5 is shown on an enlarged scale, means are provided for passing current with a density $j$ through the plate 5 in the direction indicated by the arrow, with the arrow indicated by B showing the direction of the flux from the magnetic circuit through the plate 5, the linear dimensions of the plate being represented by $k$, $b$ and $d$. The electric voltages set up according to the Hall effect may be derived from the points 7 and 8.

According to the invention, cooling ribs 6 are provided at the area of the plate-shaped body, in order to raise the energy dissipated in the element 5.

It will be evident that more than one Hall plate may be included in the magnetic circuit. Furthermore, the element 5 need not extend throughout the sectional area of the magnetic circuit, since a portion of the flux for traversing the Hall plate may also be sufficient to bring about the required electric voltage.

What is claimed is:

1. A magnetic reproducing head comprising a magnetic circuit constituted of magnetic material and containing an active gap for interaction with a moving magnetized magnetic medium thereby to establish varying magnetic flux in said circuit, a Hall-effect member arranged in said magnetic circuit so that the said magnetic flux passes transversely through it, means coupled to said Hall-effect member for passing current through it in a direction transverse to the magnetic flux, and means coupled to said Hall-effect member for deriving the electric voltage produced by the interacting magnetic flux and current.

2. A reproducing head as set forth in claim 1 wherein the Hall-effect member possesses a Hall coefficient larger than $$10^5\sqrt{\frac{k^3.b.d.\rho}{W}}$$

wherein $k$, $b$, and $d$ are the dimensions of the Hall-effect member in meters, $k$ being the dimension in the current direction, W is the electric power dissipated in the Hall-effect member in watts, and $\rho$ is the resistivity in ohm-meters.

3. A magnetic reproducing head comprising a magnetic circuit constituted of a core of magnetic material containing a first active gap for interaction with a moving magnetized magnetic medium thereby to establish varying magnetic flux in said circuit, a Hall-effect plate arranged in a second gap in the core so that the said magnetic flux passes transversely through it, means coupled to said Hall-effect plate for passing current through it in a direction transverse to the magnetic flux, and means coupled to said Hall-effect plate for deriving the electric voltage produced by the interacting magnetic flux and current.

4. A reproducing head as set forth in claim 3 wherein cooling means are provided on the core adjacent the Hall-effect plate.

5. A magnetic reproducing head comprising a magnetic circuit constituted of a core of magnetic material containing a first active gap for interaction with a moving magnetized magnetic medium thereby to establish varying magnetic flux in said circuit and a thin second gap remote from said first gap, a thin Hall-effect member in said second gap and abutting the core portions defining said second gap and arranged so that the said magnetic flux passes transversely through it, means coupled to said Hall-effect member for passing current through it in a direction transverse to the magnetic flux, means coupled to said Hall-effect member for deriving the electric voltage produced by the interacting magnetic flux and current, and means for preventing the circuit at the area of said Hall-effect member from attaining too high a temperature.

References Cited in the file of this patent

UNITED STATES PATENTS

| | | |
|---|---|---|
| 1,778,795 | Craig | Oct. 1, 1930 |
| 2,464,807 | Hansen | Mar. 22, 1949 |
| 2,714,182 | Hewitt | July 26, 1955 |
| 2,736,822 | Dunlap | Feb. 28, 1956 |
| 2,768,243 | Hare | Oct. 23, 1956 |
| 2,866,013 | Reis | Dec. 23, 1958 |

FOREIGN PATENTS

| | | |
|---|---|---|
| 705,248 | Great Britain | Mar. 10, 1954 |